United States Patent
Moussaoui

(10) Patent No.: US 8,085,556 B2
(45) Date of Patent: Dec. 27, 2011

(54) DYNAMIC CONVERTER TOPOLOGY

(75) Inventor: Zaki Moussaoui, Mountain View, CA (US)

(73) Assignee: Intersil Americas Inc., Milpitas, CA (US)

( * ) Notice: Subject to any disclaimer, the term of this patent is extended or adjusted under 35 U.S.C. 154(b) by 516 days.

(21) Appl. No.: 12/105,731

(22) Filed: Apr. 18, 2008

(65) Prior Publication Data

US 2008/0259646 A1    Oct. 23, 2008

Related U.S. Application Data

(60) Provisional application No. 60/925,382, filed on Apr. 20, 2007, provisional application No. 60/916,172, filed on May 4, 2007.

(51) Int. Cl.
   *H02M 3/335*    (2006.01)

(52) U.S. Cl. .......................................................... 363/17

(58) Field of Classification Search .................... 363/17, 363/56.02, 98, 132
See application file for complete search history.

(56) References Cited

U.S. PATENT DOCUMENTS

| | | | |
|---|---|---|---|
| 5,859,771 A | * | 1/1999 | Kniegl ............................. 363/17 |
| 2004/0151009 A1 | * | 8/2004 | Yang ........................... 363/21.08 |
| 2005/0099999 A1 | | 5/2005 | Phillips et al. |

OTHER PUBLICATIONS

Office Action Dated Jul. 21, 2010, For U.S. Appl. No. 12/148,787, filed Apr. 21, 2008.

* cited by examiner

*Primary Examiner* — Jue Zhang
(74) *Attorney, Agent, or Firm* — Paul A. Bernkopf; Graybeal Jackson LLP; Paul F. Rusyn

(57) ABSTRACT

Methods and apparatus of dynamic topology power converters are provided. One method includes monitoring at least one variable of the power converter and based on the at least one monitored variable, using a converter topology selected between at least a full-bridge converter topology and a half-bridge converter topology to achieve an efficient operation at a then current operational load.

24 Claims, 9 Drawing Sheets

DYNAMIC CONVERTER TOPOLOGY

CROSS REFERENCE TO RELATED CASES

The present application claims the benefit of U.S. Provisional Patent Application No. 60/925,382, filed on Apr. 20, 2007, and U.S. Provisional Patent Application No. 60/916,172, filed on May 4, 2007; of the foregoing applications incorporated herein by reference in their entireties.

BACKGROUND

Some electronic systems include power supplies for receiving an input voltage and converting this input voltage to a desired output voltage to be supplied to components in the electronic system that performs the desired function of the system.

For example, a computer system includes a power supply that receives an input voltage and converts this input voltage to an output voltage that is applied to, for example, a motherboard, disk drives, a monitor as well as other components. Ideally, the power supply operates as efficiently as possible, where efficiency relates to the portion of input power received by the power supply that is converted into output power provided by the power supply.

A variety of different types of power supplies exist, with a particular type utilized in a given application being determined by a variety of factors such as the amount of power needed and the efficiency of the power supply. Different types of power supplies have different topologies. One type of power supply is a DC-to-DC voltage converter that converts a supplied voltage at a first level to a DC output voltage at a desired second level. There are many different converter topologies that may be utilized for DC-to-DC converters. The type of DC-DC converter is selected based on a given application which is determined at least in part on the amount of output power needed. For example, "flyback" topology may be used when an amount of output power needed is less than 100 watts. A "push-pull" topology may be used when an amount of output power is between 100 watts to 500 watts and a "full bridge" topology may be used when an amount of output power is beyond 500 watts.

The particular topology of a voltage converter will have an efficiency that varies as a function of the power level being supplied to the output. For example, a converter of a given topology providing an output that is significantly less than it is capable of may have an efficiency that is low. Take the case of a full-bridge voltage converter which, as previously mentioned, is typically utilized where the output power to be provided is greater than 500 watts. If only 100 watts is needed at the output, the full-bridge converter can supply this required output level but the efficiency of the converter in doing so may be unacceptably low.

A voltage converter is typically formed in an integrated circuit which a customer integrates into their overall electronic system. At present, such a customer must select the integrated circuit for the voltage converter topology that provides the required maximum output power. Under light load conditions, the selected converter must be operated less efficiently.

For the reasons stated above and for other reasons stated below which will become apparent to those skilled in the art upon reading and understanding the present specification, there is a need in the art for a voltage converter topology which operates efficiently under both normal and light load conditions.

SUMMARY OF THE INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of operating a power converter is provided. The method includes monitoring at least one variable of the power converter and based on the at least one monitored variable, using a converter topology selected between at least a full-bridge converter topology and a half-bridge converter topology to achieve an efficient operation at a then current operational load.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide converters that operates efficiently under both normal loads and light loads by changing between circuit topologies based on the load needed at the then current time. In particular, in some embodiments a control circuit monitors the output load via the output current of the converter and manipulates switches in the converter to select between a given topology that will provide efficient operation based on the monitored output load. In addition, some embodiments provide superiority interleaved half bridges. These embodiments only require one transformer and they only require 1 output rectification. Therefore, there is no need for two large (expensive) capacitors. Moreover, these embodiments use common known topologies, such as but not limited to, half-bridge and full-bridge topologies. In embodiments utilizing symmetrical half-bridge and phase shift full bridge topologies, a 50% duty cycle is used and the symmetrical half bridge is zero voltage switching (ZVS) over the entire range of the load. Embodiments can be used not only on DC-to DC converters but also AC-to-DC converters.

Figure 1:
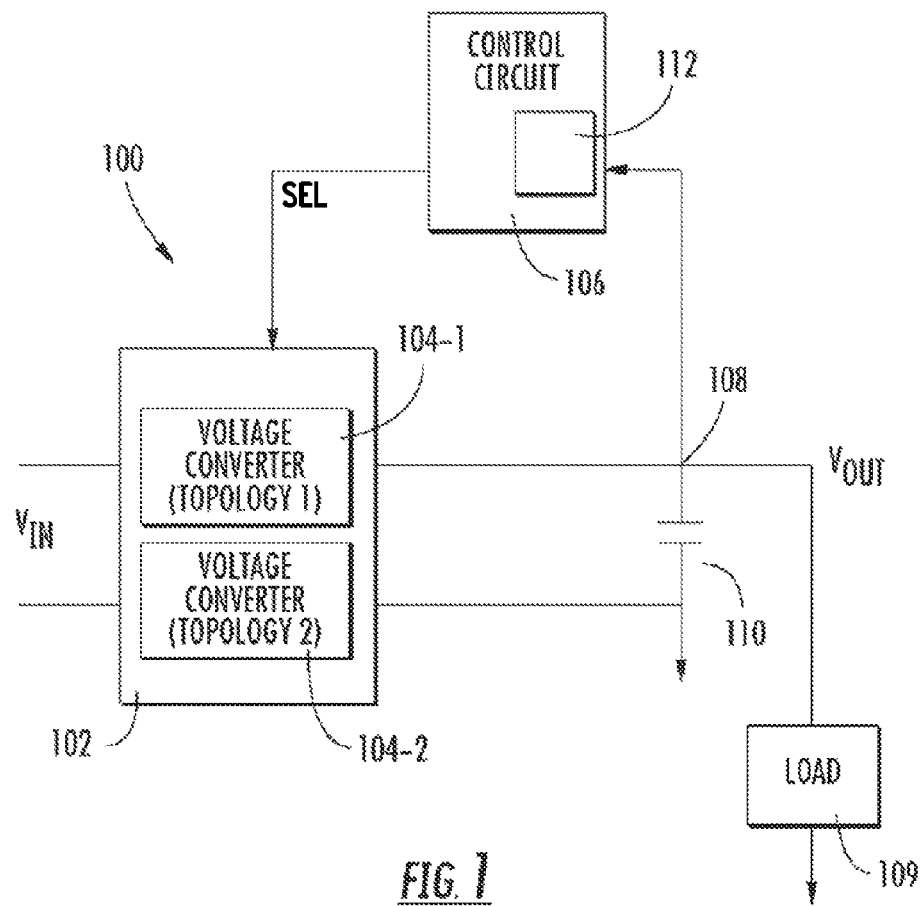
FIG. 1 is a block diagram of the a converter of one embodiment of the present invention.

Referring to FIG. 1, a functional block diagram of a topology-switching power converter system 100 of one embodiment is illustrated. As illustrated, converter system 100 includes a variable converter topology converter 102 that in this embodiment includes a first voltage converter circuit 104-1 and a second voltage converter circuit 104-2. A control circuit 106 generates a selection signal SEL in response to a parameter associated with an output power provided on an output node 108. A load 109 is coupled to the output node 108. The control circuit 106 includes comparing circuitry 112 such as error amplifiers that compare variables, e.g., current, associated the output load to a threshold. Also illustrated in FIG. 1 is an output capacitor 110.

In operation, the control circuit 106 monitors the output power at the output node 108 and uses the information to control the topology of the variable topology voltage converter 102. Based on the output load, the control circuit 106 generates a signal SEL that determines which voltage converter circuit 104-1 or 104-2 is to be used by the variable topology voltage converter 102. In particular, the most efficient voltage converter circuit 104-1 or 104-2 is selected based on the output power at the output node 108.

In one embodiment the output power is monitored by the control circuit 106, by monitoring an output current at the output voltage. In one embodiment, the control circuit 106 compares the monitored output voltage (or current) with a threshold value. In this embodiment, the content of the SEL signal depends on the comparison to the threshold value. As discussed above, the control circuit 106 generates the SEL signal to select the voltage converter circuit 104-1 or 104-2 that is most efficient under the then current conditions at the output node 108.

In one embodiment, the voltage converter circuit 104-1 is a full-bridge voltage converter circuit and the second voltage converter 104-2 is a half-bridge converter circuit. In this example, the control circuit 106 generates the SEL signal to select the full-bridge voltage converter circuit 104-1 when the detected voltage (or current) indicates an output power at the output node 108 that is greater than 500 watts. Conversely, in this example, when the control circuit 106 detects the voltage (or current) indicates an output power at the output node 108 is less than 500 watts, the control signal generates the SEL signal to select the half-bridge voltage converter 104-2.

In other embodiments, the variable converter topology converter 102 includes more than two voltage converter circuits 104. In such an embodiment, the control circuit 106 monitors the detected output power at node 108 and depending upon where this detected output power falls within several ranges of output power, the control circuit then generates the SEL signal to cause the topology selection circuit 102 to select the appropriate voltage converter circuit 104.

Also note that in other embodiments the control circuit 106 monitors or detects different parameters associated with the output power at the output node 108. For example, the control circuit 106 detects only the output voltage Vout or only the current being supplied to the node or a combination of the two. In other embodiments, the control circuit alternatively generates the SEL signal to control the selection of the active voltage converter 104 that is responsive to other factors determined from the sensed current and/or voltage or from other sensed parameters such as but not limited to efficiency, temperature and the like.

Figure 2A:
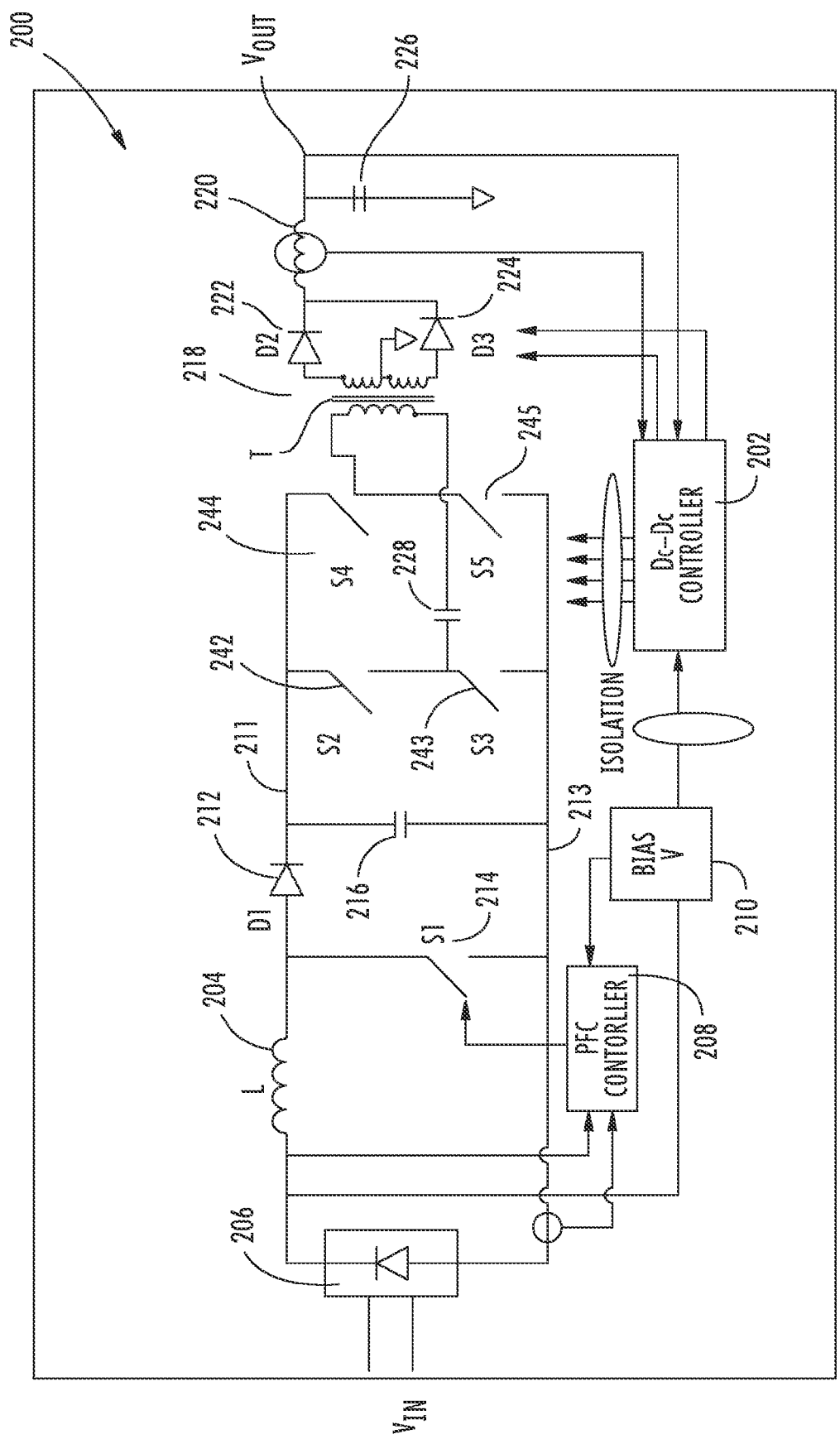
FIG. 2A is a schematic diagram of a converter incorporating a switch controlling system of one embodiment the present invention.

FIG. 2A illustrates a dynamic voltage converter 200 of one embodiment of the present invention. In particular, in FIG. 2A the voltage converter 200 is in the form of a conventional full bridge converter. In embodiments of the converter of FIG. 2A, controller 202 (which provides the functions as control circuit 106 of FIG. 1) configures switches 242 (S2), 243 (S3), 244 (S4) and 245 (S5) to create the desired converter topology based at least in part on feedback from an output node 230 which may include a load current. The converter 200 includes, a bridge diode (bridge rectifier) 206 to convert the line VIN into a Dc voltage. The converter 200 also includes an inductor 204, diode (D1) 212, capacitor 216 and switch (S1) 214. A power factor correction (PFC) controller is coupled to the inductor L 204 and switch (S1) 214 to control the duty cycle of switch (S1) 214 for a regulated output of the converter 200. As illustrated the switch 214 (S1) is coupled between a first rail 211 via diode 212 and a second rail 213. The converter 200 also includes a bias V 210 that provides an initial biasing voltage to the controller 200 to start operating. The bias voltage 210 provides signals to the PFC controller 208 and controller 202. Further included in converter 200 is a transformer (T) 218, rectifier 221, diodes (D2) 222 and (D3) 224, output inductor 220, output capacitor 226 and output node 230. The output inductor 220 and output capacitor 226 form a low pass filter. As illustrated, the controller 202 in this embodiment receives feedback signals from the output node 230 and the output inductor 220.

As discussed above, in embodiments the controller 202 selects between topologies based on one or more select variables. In FIG. 2A, switches 242, 243, 244 and 245 (a first pair of switches 242 (S2) and 243 (S3) and a second pair of switches 244 (S4) and 245 (S5)) are illustrated as forming a full-bridge converter. However, controller 202, in this embodiment changes the converter topology by manipulating the second pair of switches 244 (S4) and 245 (S5) to form a half-bridge topology when desired. In particular, in the full-bridge topology, as indicated in FIG. 2A, switches 244 (S4) and 245 (S5) are controlled to open and close in their usual manner during operation of a full-bridge converter topology 200. In a half-bridge converter topology, the second pair of switches 244 (S4) and 245 (S5) are manipulated by controller 202 to maintain switch 244 (S4) open and maintain switch 245 (S5) closed. This manipulation of switches 244 (S4) and 245 (S5) by controller 202 changes the converter topology from a full-bridge converter topology to a half-bridge converter topology. Hence, in embodiments, controller 202 of FIG. 2A can change the topology of the converter 200 into the half-bridge topology and back again to a full-bridge converter. The switches 242, 243, 244 and 245 can generally be referred to as switching elements 242, 243, 244 and 245.

With converter 200, of FIG. 2A, using this half-bridge topology, transformer 218 only receives half the voltage it does if it was in its full-bridge converter topology. Hence, a switching frequency at which switches 242 (S2) and 243 (S3)

are turned on and off in converter 200 in the half-bridge configuration are one half the switching frequency of the switches in the full-bridge topology as will appreciated by those skilled in the art. In embodiments, the symmetric half bridge and the full bridge configurations both drive their respective legs at a 50% duty cycle. The 50% duty load guaranties ZVS over the entire output load. It also gives the benefit of reducing the size of the capacitor 226 and the transformer 218.

Figure 2B:
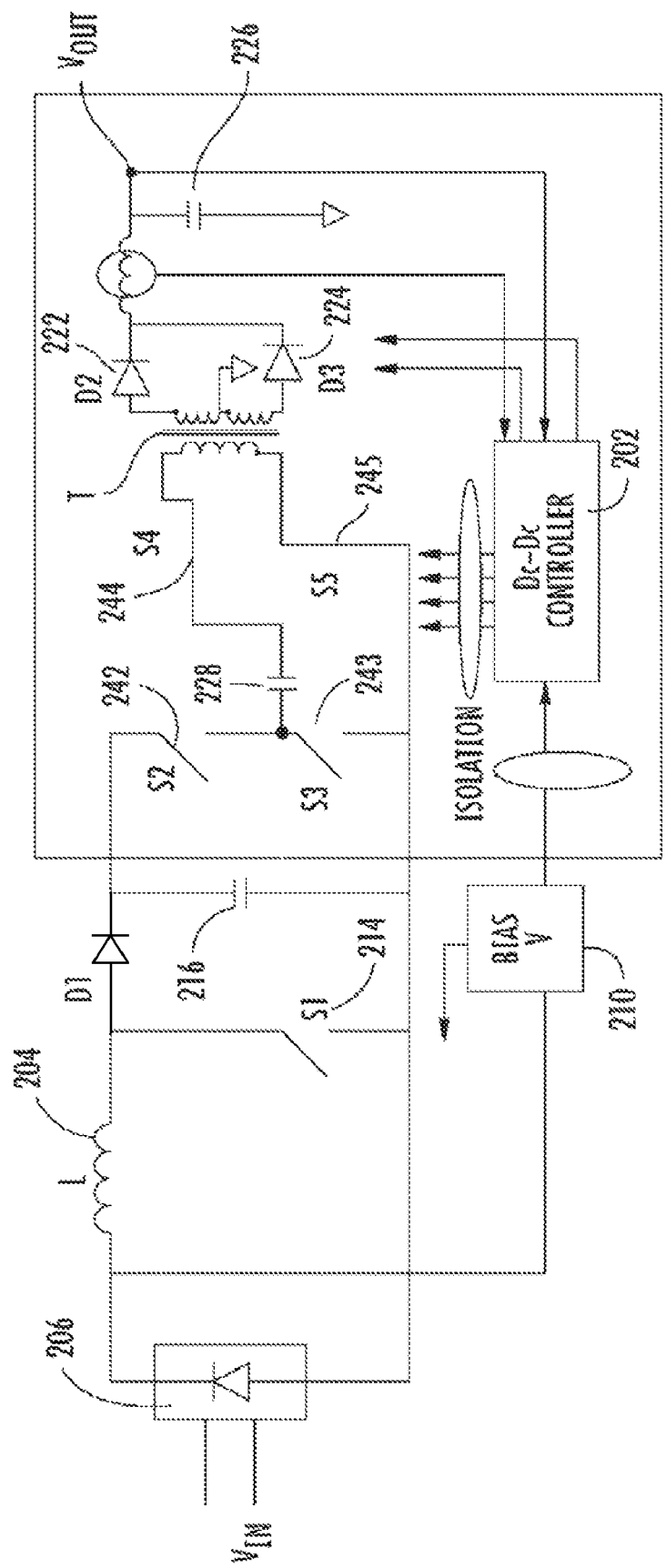
FIG. 2B is a schematic diagram of a single stage half bridge converter of one embodiment of the present invention.

FIG. 2B is a functional schematic diagram of a single stage power factor corrected voltage converter 203 corresponding to the operation of converter 200. This diagram illustrates that during operation of the converter 200 the switches 242 (S2) and 243 (S3) are running at 50% duty cycle (i.e. one half the switching frequency in the converter 150 of FIG. 2A) such that a power factor inductor 204 is operating in discontinuous mode of operation which thereby gives natural power factor correction, as will be appreciated by those skilled in the art. Because the inductor 204 is operating in a discontinuous mode, it provides its own power correction factor correction (PFC). Thus, in the embodiment of FIG. 2B, when the inductor 204 is run in discontinuous mode of operation, the PFC is naturally achieved and the regulation is realized by modulating the frequency of switches 243 (S3) and 242 (S2). Further, FIG. 2B illustrates the versatility of an embodiment of the controller 202 to be used with different topologies.

Figure 3:
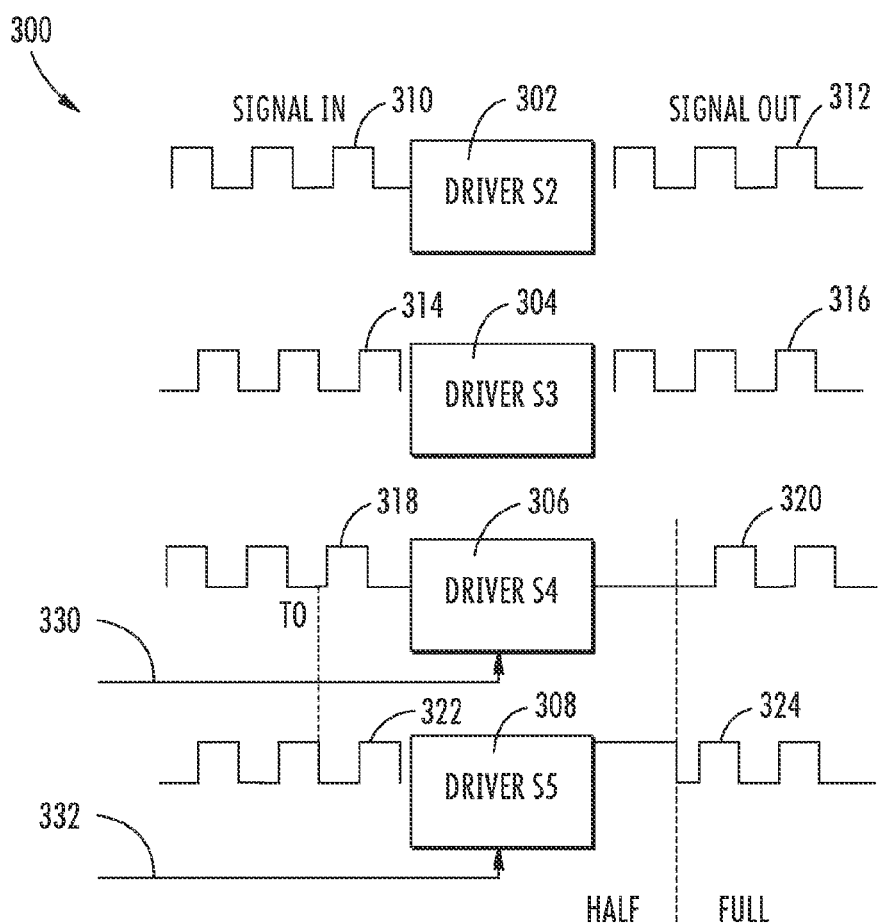
FIG. 3 is an illustration of drivers and signals to drive switches of one embodiment of the present invention.

In embodiments, the dynamic topology change is implemented by control inputs for a controller such as controller 202 of FIG. 2A. The control inputs are applied to drivers associated with their respective switches. An example, of drivers associated with switches 242 (S2), 243 (S3), 244 (S4) and 245 (S5) of FIG. 2A are illustrated in FIG. 3. In particular, driver 302 is associated with switch 242 (S2), driver 304 is associated with switch 243 (S3), driver 306 is associated with switch 244 (S4) and driver 308 is associated with switch 245(S5). As FIG. 3 illustrates, respective "in signals" 310, 314, 318 and 322 are applied to the respective drivers 302, 304, 306 and 308. In response to the "in signals" 310, 314, 318 and 322, drivers 302, 204, 306 and 308 provide respective "out signals," 312, 316, 320 and 324. In the example of FIG. 3, the controller 202 is sending control signals 330 and 332 to drivers 306 and 308 to change the topology to a half-bridge controller. In particular, control signal 330 from the controller 202 to driver 306 causes the "out signal" 320 to open switch 244 (S4) and control signal 332 from the controller 202 causes the "out signal" 324 to close switch 245 (S5) thereby creating the half-bridge topology from the full-bridge topology. The circuit can dynamically switch back to a full-bridge topology converter, such as upon detection of a high output power level, by ceasing the control signals 330 and 332. This will allow switches 244 (S4) and 245 (S5) to open and close in there usual manner for full bridge operation. As stated above, in the symmetric half-bridge converter topology, the transformer 218 (T) sees half the voltage it will see in the full bridge converter topology, so theoretically the half-bridge mode can be run at half the switching frequency as the full bridge mode.

The switching between respective topologies can be based on one or more select variables and embodiments of the present invention are not limited to a single type. Examples of switching variables include but are not limited to output current, output power, phase shift, switching frequency, hold up time and temperature. Hold up time can be used because the symmetrical half bridge can be used as a buck or boost converter. Regarding efficiency, the half bridge provides an efficiency improvement because the half bridge can run at half the switching frequency and only uses 2 switches.

A variety of control algorithms relating to the switching between topologies is contemplated and embodiments of the present invention is not limited to a specific algorithm. For example, the controller 202 in one example monitors the phase shift of two legs of the full-bridge while running in a full-bridge converter topology. Wherein the first leg is defined by switch 242 and 243 and the second leg is defined by 244 and 245. When the phase shift gets to a specified maximum (threshold), the control circuit 202 will engage the topology change. While running in a half-bridge converter topology, the controller 202 can monitor the switching frequency and when it gets to a minimum set value (threshold), the controller 202 will initiate the topology change back to full-bridge converter topology.

Figure 4:
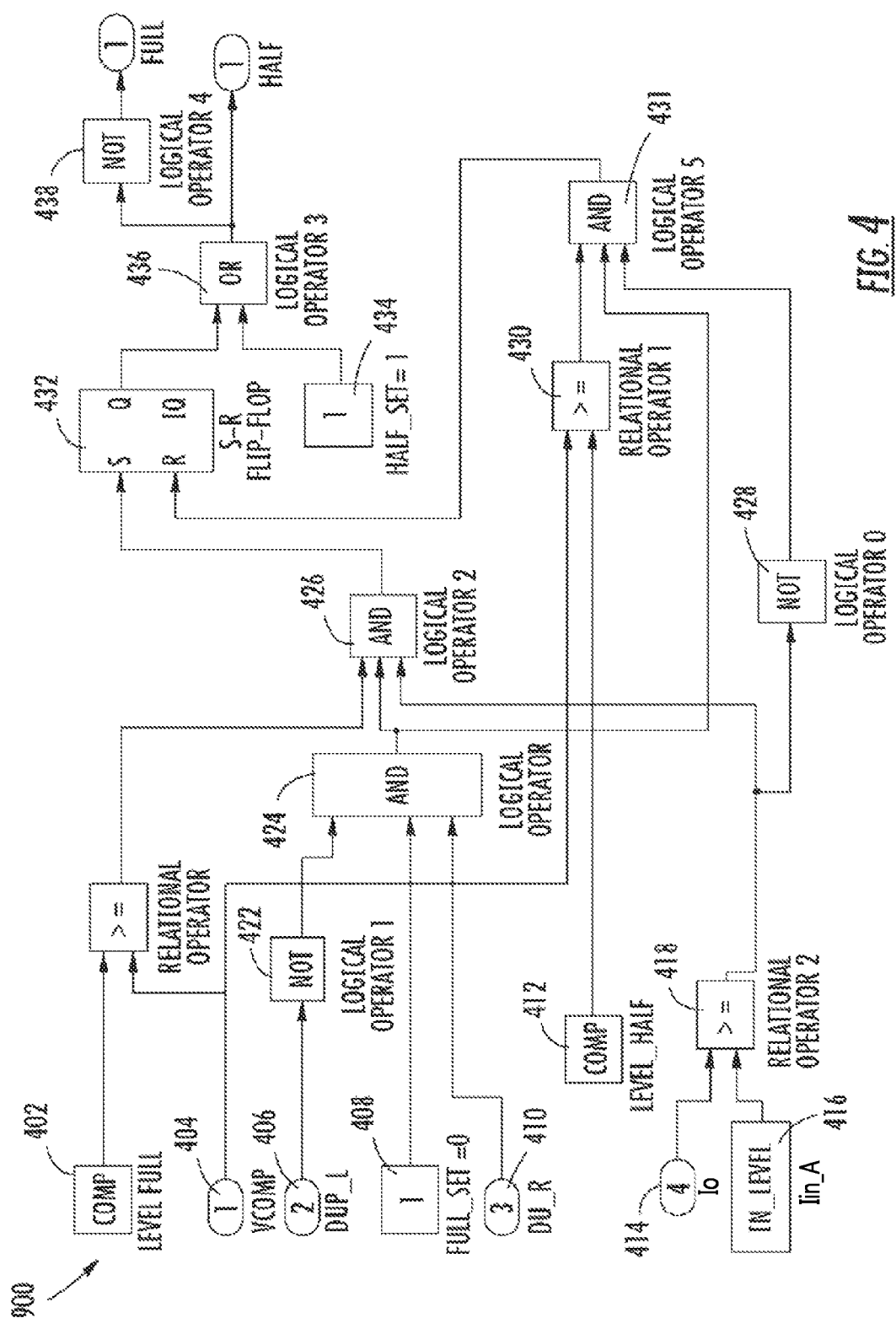
FIG. 4 is dynamic change logic diagram of one embodiment of the present invention.

Referring to FIG. 4, an example of dynamic change logic 400 that can be applied by the controller 202 is illustrated. In this example, the change in topology is based on the level of a compensator output and the average current monitored. Since the current ramp information is on the current sense pins, a sample and hold is used on the mid point level and average circuit is used to estimate the average output current. In embodiments, a current threshold is programmed for transition from one mode to another. In going from the full-bridge topology to the half-bridge topology, when the threshold is reached, the controller will wait until the leg that will be used for the half bridge is active and then disable the non-need leg (e.g. switch 244 and 245 of FIG. 2A). Going from the half-bridge to full-bridge topology, once the load current increase past the threshold, the controller will wait until the active leg is off turn (e.g. switches 242 and 243) and then activate the previously deactivated leg (e.g. switch 244 and 245).

In FIG. 4, circuit logic is used to produce a full-bridge converter topology signal or a half-bridge converter topology signal 442 based on inputs. The circuit logic includes relation operators 420, 418 and 430, logical operators 422, 424, 426, 428, 431, 436 and 438, flip-flop 432. The inputs include Level full 402, Vcomp 404, DUP-L 406, full-set 408, DL-R 410IO 414, Iin-A 416 and half-set 434. In this embodiment, when the Vcomp 404 level is less than Level-half 412 (indicating a small effective duty cycle) and the current Io 414 is less than Iin-A 416, the topology is switched from a full-bridge converter topology to a half-bridge converter topology. When the Vcomp 404 level, which is an output of an error amplifier inside the controller, is higher than level full 402 (indicating a very low effective switching frequency), and the current Io 414 is more than the Iin-A 416, the topology is switched from a half-bridge converter topology to a full-bridge converter topology. Both of the dynamic changes are enabled during the time when the DUP-L 406 is off and the DL-R 410 is on. Wherein the DUP-L 406 is the output of the upper left leg mosfet and the DL-R 410 is the driver of the lower right leg mosfet. The input Full-set 408 and Half-set 434 are used to disable the dynamic change and force the converter to run in either the half-bridge converter topology or the full-bridge converter topology. In operation, level 404 is monitored using 402. When 404 is less than 402, the system 900 is ready to go into half-bridge mode. When this occurs, in one embodiment, we wait until 406 is low and 410 is high before going into half-bridge mode as discussed above.

Figure 5:
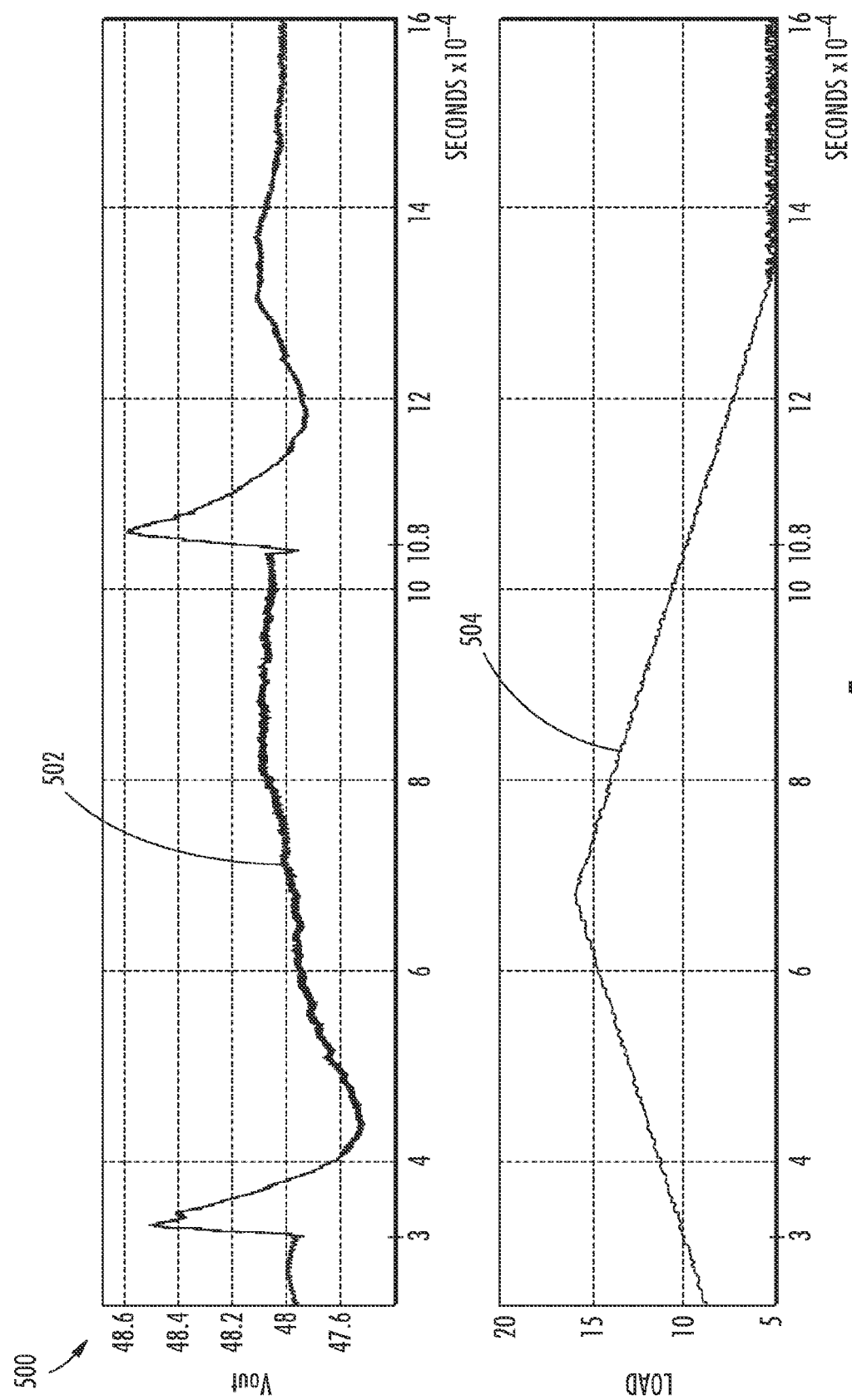
FIG. 5 is a graph that illustrates simulated topology switch behavior for a dynamic converter topology of one embodiment of the present invention.

Graphs 500 of FIG. 5, illustrates the dynamic change in topology when the load current 504 moves up to 10 Amps. At 10 amps, corresponding to about 300 μseconds, the converter moves from a half-bridge converter topology to a full-bridge converter topology. When the load current 504 moves down and crosses 10A at about 1.08 msec, the converter topology again changes from a full-bridge converter topology to a half-bridge converter topology. In both cases, the change in VOUT 502 upon topology change is only about 0.5 volts (about 1%) so the output will not have a major disturbance when a transition from one mode to another occurs.

Figure 6:
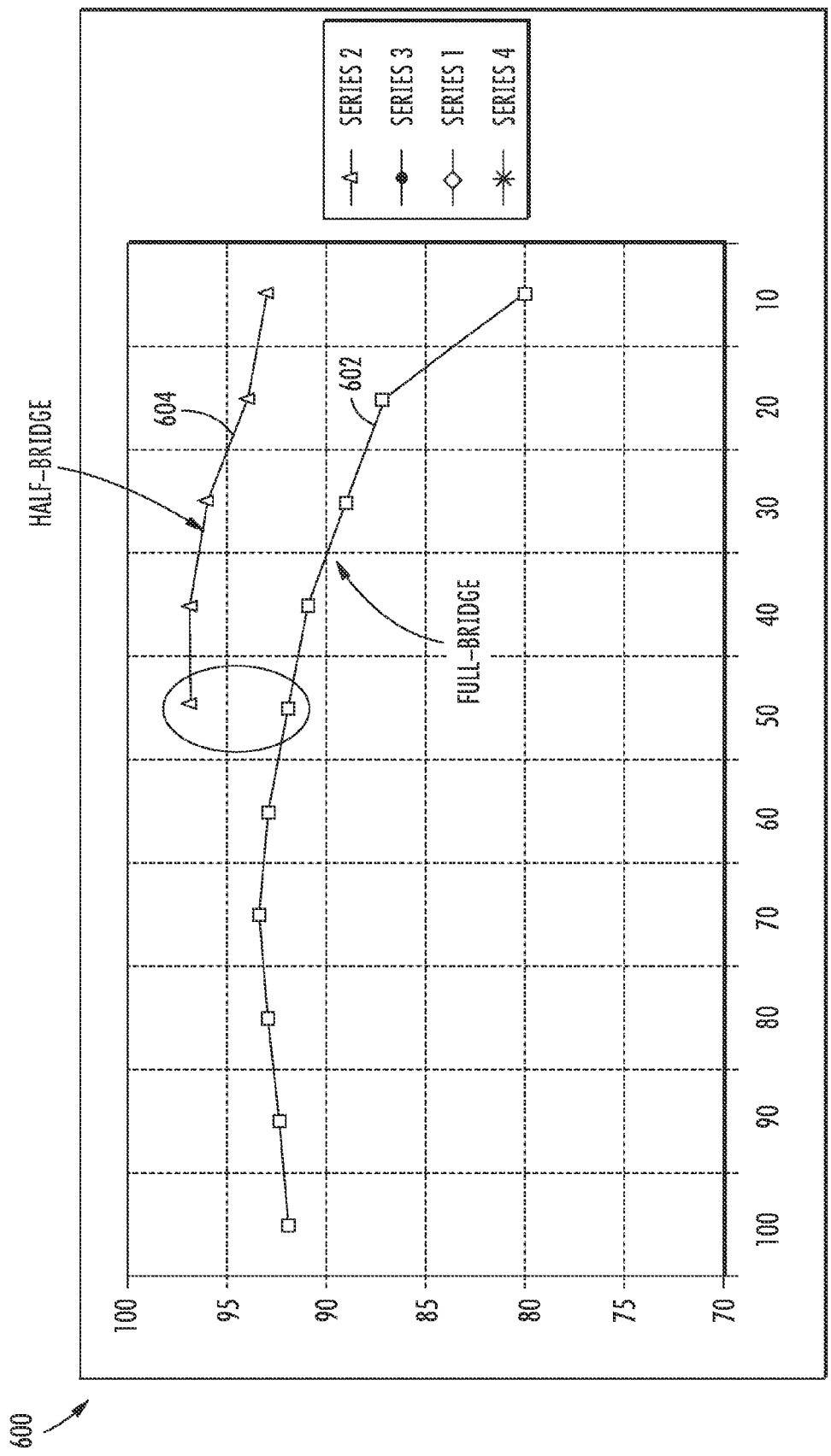
FIG. 6 is a graph that illustrates simulated expected efficiency improvement for a dynamic converter topology converter of one embodiment of the present invention.
Figure 7:
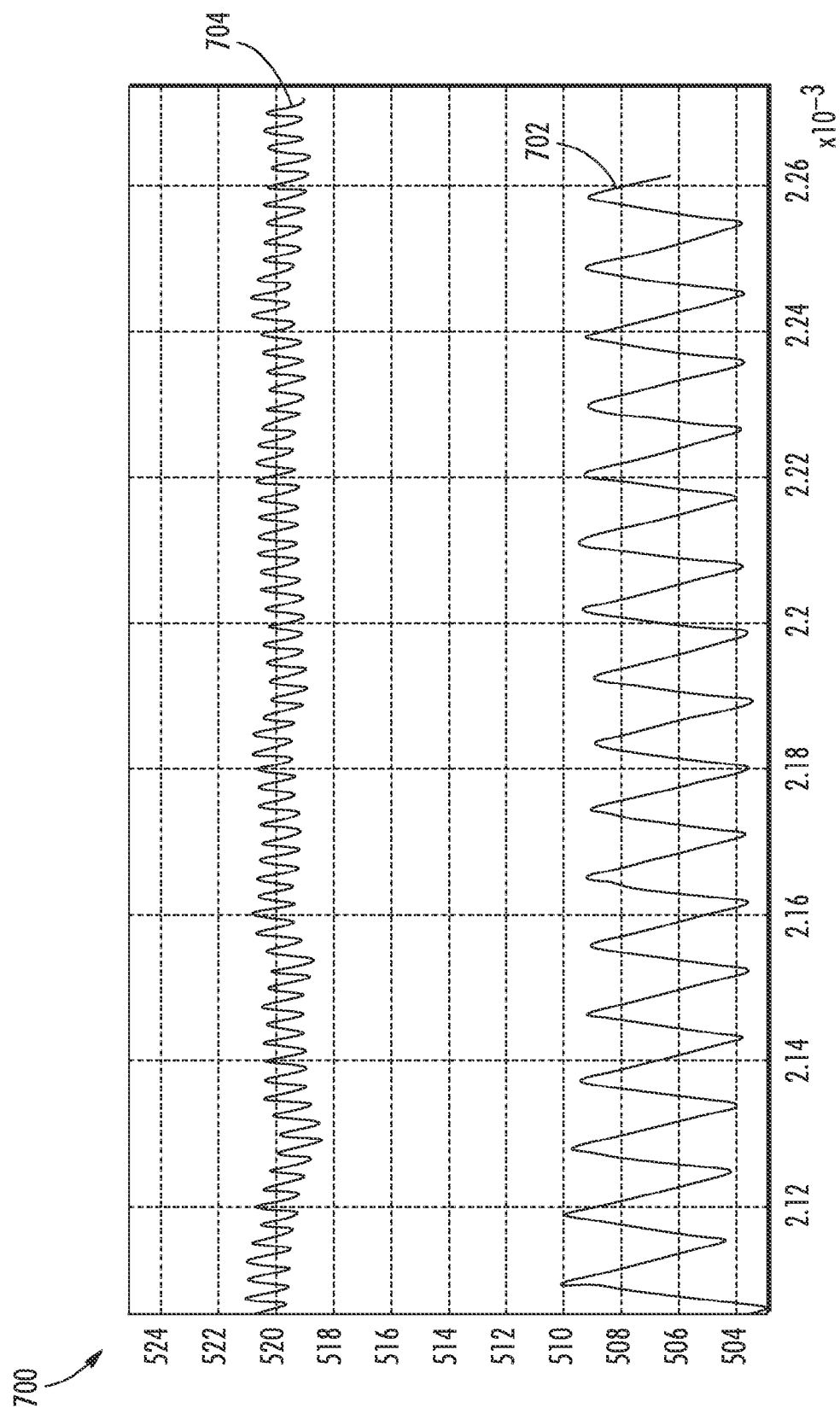
FIG. 7 is a graph that illustrates a power input simulated at 50% of load for a dynamic converter topology of one embodiment of the present invention.

Graph 600 of FIG. 6 illustrates the efficiency improvement (efficiency in 5) moving from using a full-bridge to a half-bridge at a mid point level. An increase from 92 to about 97% is shown between a full-bridge configuration curve 602 and the half bridge configuration curve 604 at a mid point level of about 500 W. In particular, curve 604 is the efficiency of the half bridge from 100 W to 500 W reading from right to left, and curve 602 is the efficiency of the full bridge from 100 W to 1000 W reading from right to left. Further, graph 700 of FIG. 7 illustrates the input power using the full-bridge converter topology 704 and the input power consumed using the half-bridge converter topology 702 simulated at 50% of the load. In FIG. 7, the simulated input power consumed is shown when the output power is at 480 W. The units of measure of the graph of FIG. 7, is time in the X axis and instantaneous input power in the Y axis.

Figure 8:
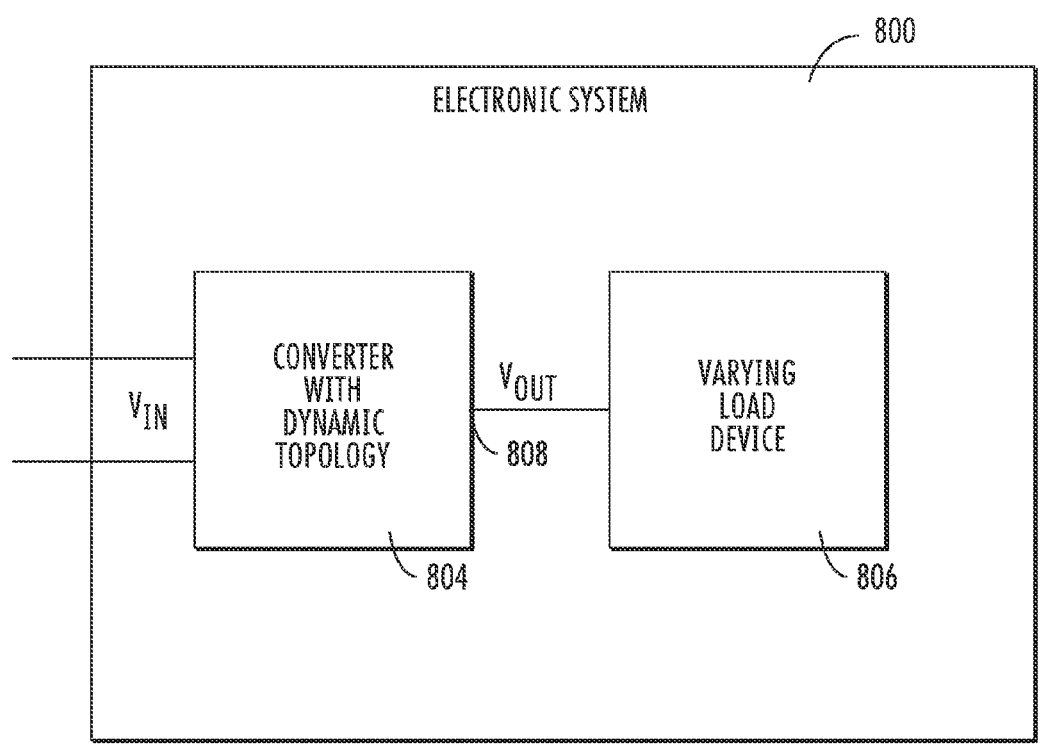
FIG. 8 illustrates an electronic system of one embodiment of the present invention.

Referring to FIG. 8, an electronic system of one embodiment is illustrated. This embodiment includes a dynamic converter 804 such as converter 200 of FIG. 2A and a varying load device 806. As illustrated, the dynamic converter 804 takes a voltage input VIN and provides a VOUT at output node 808. As illustrated in FIG. 2A, a feedback at the output node 808 is used to determine the converter topology used by the dynamic converter 804. The varying load device 806 can be any type of load that varies its required voltage input such as but not limited to, computer systems and displays. Examples of components in the computer system than require varying voltage levels include but are not limited to mother boards and disk drives.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of operating a power converter, the method comprising:
   monitoring at least one condition of the power converter;
   based on the at least one monitored condition, using a converter topology selected between at least a full-bridge converter topology and a half-bridge converter topology to achieve an efficient operation at a then current operational load; and
   wherein monitoring at least one condition of the power converter further comprises, when running in the half-bridge converter topology, monitoring the switching frequency.

2. The method of claim 1, further comprising:
   comparing each of the monitored at least one condition with a select threshold; and
   changing the converter topology when the monitored at least one condition passes the threshold.

3. The method of claim 1, wherein monitoring the at least one condition further comprises:
   monitoring at least one of output current, output power, phase shift, switching frequency, hold up time and temperature.

4. The method of claim 1, wherein monitoring at least one condition of the power converter further comprises:
   when running in the full-bridge converter topology, monitoring the phase shift.

5. The method of claim 1, further comprising:
   selectively disabling the power converter's ability to switch between the at least full-bridge converter and the half-bridge converter topologies.

6. A method of operating a DC-to-DC power converter, the method comprising:
   determining the efficiency of the power converter; and
   when it is determined that the power converter is running below a selected efficiency, switching a converter topology of the power converter between a full-bridge converter topology and a half-bridge converter topology, wherein switching from a full-bridge converter topology to a half-bridge converter topology further comprises, from a first and second pair of switching elements, manipulating a first switching element in the second pair to remain open and a second switching element in the second pair to remain closed.

7. The method of claim 6, wherein switching from a half-bridge converter topology to a full-bridge converter topology further comprises:
   allowing the first switching element in the second pair of switching elements and the second switching element in the second pair of switching elements to open and close in a usual manner for full-bridge converter operation.

8. The method of claim 6, wherein determining the efficiency of the power converter further comprises:
   monitoring at least one condition related to efficiency; and
   comparing each of the at least one variables to a defined threshold.

9. The method of claim 8, wherein monitoring the at least one condition further comprises:
   monitoring at least one of output current, output power, phase shift, switching frequency, hold up time and temperature.

10. The method of claim 8, wherein monitoring at least one condition further comprises:
    when running in the full-bridge converter topology, monitoring the phase shift.

11. The method of claim 8, wherein monitoring at least one condition further comprises:
    when running in the half-bridge converter topology, monitoring the switching frequency.

12. A voltage converter circuit, the circuit comprising:
    at least first and second voltage converter topologies, wherein the first voltage converter topology is a full-bridge converter topology and the second voltage converter topology is a half-bridge converter topology;
    an output node;
    a controller operable to implement one of the first and second voltage converter topologies to provide an output power to the output node in response to a parameter associated with an output load; and
    wherein the controller is further operable to switch from a full-bridge converter topology to a half-bridge converter topology by manipulating a first switching element in the second pair to remain open and a second switching element in the second pair to remain closed, and switch from a half-bridge converter topology to a full-bridge converter topology by allowing the first switching element in the second pair and the second switching element in the second pair to open and close in a usual manner for full-bridge converter operation.

13. The voltage converter of claim 12, wherein the at least first and second voltage converter topologies share a first and second pair of switching elements.

14. The voltage converter of claim 12, wherein the controller is further operable to manipulate the second pair of switching elements to change between the first and second voltage converter topologies.

15. A DC-to-DC voltage converter, the converter comprising:
    a first rail having a first end configured to receive a signal at a first potential;
    a second rail having a first end configured to receive a signal at a second potential;

an input inductor coupled to the first rail;
a first switching mechanism coupled between the first and second rail configured to control a regulated output of the converter;
a first and second pair of switching mechanisms that form a converter topology of the converter, the first and the second pair of switching elements coupled across the first and the second rail;
a transformer having a primary winding selectively coupled across the first and second rails via the first and second pair of switching mechanisms, the transformer further having at least one secondary winding coupled to a low pass filter coupled to and output node;
a controller configured to selectively control the second pair of switching mechanisms to change the converter topology between a full-bridge converter and a half-bridge converter; and
wherein the controller is further configured to switch to a half-bridge converter by maintaining a first switch of the second pair of switching mechanisms open and maintaining a second switch in the second pair of switching mechanism closed.

16. The converter of claim 15, further comprising:
a bridge rectifier coupled to receive the first and second potential signals, the bridge rectifier further coupled between the first and second rails; and
a power factor correction controller coupled to inductor configured to control the duty cycle of the first switching mechanism.

17. An electronic system, the system comprising:
a varying load device having at least one power input;
a converter having at least one output coupled to the at least one power input of the varying load device; the converter including,
at least first and second voltage converter topologies, wherein the first voltage converter topology is a full-bridge converter topology and the second voltage converter topology is a half-bridge converter topology,
an output node, and
a controller operable to implement one of the first and second voltage converter topologies and operable responsive to a switching frequency of at least one of the first and second voltage converter topologies to implement the other one of the first and second voltage converter topologies;
wherein the converter includes an H-bridge structure including first and second pairs of switching elements, each pair of switching elements including first and second switching elements, and
wherein the controller is further operable to control all the switching elements in the H-bridge structure to operate in the full-bridge converter topology and to open the first switching element and close the second switching element in the second pair and to control the switching elements in the first pair to operate in the half-bridge converter topology when the switching frequency reaches a threshold value.

18. A voltage converter, the circuit comprising:
a plurality of voltage converter circuits, each voltage converter circuit having an associated topology; and
a control circuit coupled to the voltage converter circuits, the control circuit operable to select one of the voltage converter circuits to provide an output power on an output node, and the control circuit operable in response to a switching frequency of the selected voltage converter circuit to select another one of the voltage converter circuits;
wherein the voltage converter includes an H-bridge structure including first and second pairs of switching elements, each pair of switching elements including first and second switching elements, and
wherein the control circuit is operable to control all the switching elements in the H-bridge structure to operate in a full-bridge topology and to open the first switching element and close the second switching element in the second pair and to control the switching elements in the first pair to operate in a half-bridge topology responsive to the switching frequency reaching a threshold value.

19. A voltage converter, the circuit comprising:
a full-bridge voltage converter circuit and an LLC resonant half-bridge voltage converter circuit; and
a control circuit coupled to the full-bridge and LLC resonant half-bridge voltage converter circuits, the control circuit operable in first and second modes to control the full-bridge voltage converter circuit and LLC resonant half-bridge voltage converter circuit, respectively, to provide output power on an output node, the control circuit operable in the first mode to detect a first parameter of the full-bridge voltage converter circuit and switch to the LLC resonant half-bridge voltage converter circuit responsive to the first parameter reaching a first threshold value and operable in the second mode to detect a switching frequency of the LLC resonant half-bridge voltage converter circuit and switch to the full-bridge voltage converter circuit responsive to the switching frequency reaching a second threshold value.

20. The voltage converter of claim 19, wherein the control circuit is operable responsive to the switching frequency reaching a minimum frequency value to switch to operation of the full-bridge voltage converter circuit.

21. The voltage converter of claim 19, wherein the LLC resonant half-bridge voltage converter circuit comprises a series LLC resonant half-bridge voltage converter circuit.

22. The voltage converter circuit of claim 19, wherein the voltage converter includes additional voltage converter circuits, each voltage converter circuit having an associated topology, and wherein the control circuit is operable to detect additional parameters and to switch among the voltage converter circuits responsive to the detected first, second, and additional parameters.

23. The voltage converter of claim 19,
wherein the full-bridge voltage converter circuit includes an H-bridge including first, second, third, and fourth switching elements; and
wherein the first parameter comprises a phase shift between control signals being applied to the first and fourth and the second and third switching elements of the H-bridge.

24. The voltage converter of claim 20, wherein the control circuit generates control signals to control the first, second, third, and fourth switching elements during operation of the full-bridge voltage converter circuit and generates controls signals to open the third switching element and close the fourth switching element to thereby form the LLC resonant half-bridge voltage converter circuit and during operation of the LLC resonant half-bridge voltage converter circuit further generates control signals to control to the first and second switching elements.

* * * * *